United States Patent
Kwon et al.

(10) Patent No.: US 11,255,979 B2
(45) Date of Patent: Feb. 22, 2022

(54) APPARATUS AND METHOD FOR GENERATING DISTRIBUTION INFORMATION ABOUT POSITIONING DIFFERENCE BETWEEN GNSS POSITIONING AND PRECISE POSITIONING BASED ON IMAGE AND HIGH-DEFINITION MAP

(71) Applicants: KOREA EXPRESSWAY CORP., Gimcheon-si (KR); U1GIS, Uiwang-si (KR)

(72) Inventors: Oh Cheol Kwon, Uiwang-si (KR); In Gu Choi, Seongnam-si (KR); Shi Han Kim, Seoul (KR); Jae Hyung Park, Suwon-si (KR); Sung Hwan Kim, Seoul (KR); Gi Chang Kim, Anyang-si (KR); Duk Jung Kim, Yongin-si (KR)

( * ) Notice: Subject to any disclaimer, the term of this patent is extended or adjusted under 35 U.S.C. 154(b) by 224 days.

(21) Appl. No.: 16/683,292

(22) Filed: Nov. 14, 2019

(65) Prior Publication Data
US 2021/0072405 A1    Mar. 11, 2021

(30) Foreign Application Priority Data
Sep. 11, 2019   (KR) .................. 10-2019-0112767

(51) Int. Cl.
  *G06T 7/73*    (2017.01)
  *G01S 19/45*   (2010.01)
  (Continued)

(52) U.S. Cl.
  CPC .............. *G01S 19/41* (2013.01); *G01S 19/48* (2013.01); *G06T 7/73* (2017.01); *G06T 2207/30256* (2013.01)

(58) Field of Classification Search
  CPC . G01S 19/41; G01S 19/48; G06T 7/73; G06T 2207/30256
  See application file for complete search history.

(56) References Cited

U.S. PATENT DOCUMENTS

2013/0116908 A1  5/2013  Oh et al.
2018/0038939 A1  2/2018  Bruemmer et al.

FOREIGN PATENT DOCUMENTS

EP   2878975       6/2015
JP   2002-214324   7/2002
(Continued)

OTHER PUBLICATIONS

English Specification of JP2007-309757A.
(Continued)

*Primary Examiner* — Mathew Franklin Gordon
(74) *Attorney, Agent, or Firm* — Antonio Ha & U.S. Patent, LLC

(57) ABSTRACT

According to an embodiment, an apparatus and method for generating distribution information may include periodically generating GNSS information including GNSS positioning information and a positioning time, generating image information including an image of at least one or more facility object, at the positioning time, while a vehicle drives, obtaining precise positioning information for a capturing position at the positioning time based on the image information, a high-definition map, and the GNSS information, calculating a positioning difference which is a difference between the GNSS positioning information and the precise positioning information, and generating distribution information including the GNSS information, the positioning difference, and the precise positioning information. The high-definition map includes information for feature point spatial coordinates and a property for each facility object.

12 Claims, 12 Drawing Sheets

(51) Int. Cl.
*G01S 19/40* (2010.01)
*G01S 19/41* (2010.01)
*G01S 19/48* (2010.01)

(56) References Cited

FOREIGN PATENT DOCUMENTS

| | | |
|---|---|---|
| JP | 2005-265494 A | 9/2005 |
| JP | 2007-309757 A | 11/2007 |
| JP | 2014-048205 A | 3/2014 |
| JP | 2014-066635 A | 4/2014 |
| JP | 2016-020812 A | 2/2016 |
| JP | 2017-072450 A | 4/2017 |
| JP | 2017-156112 A | 9/2017 |
| JP | 6384521 | 9/2018 |
| KR | 10-2004-0074579 | 8/2004 |
| KR | 10-1131049 | 3/2012 |
| KR | 10-1442703 | 9/2014 |
| KR | 10-1448268 | 10/2014 |
| KR | 10-2015-0083161 | 7/2015 |
| KR | 10-2017-0049489 | 5/2017 |
| KR | 10-2019-0102665 | 9/2019 |
| WO | 2017-12059 | 7/2017 |

OTHER PUBLICATIONS

English Specification of JP2005-265494 A.
English Specification of JP2016-020812A.
English Specification of JP2014-048205A.
English Specification of JP2014-066635A.
English Specification of JP2017-072450A.
English Specification of JP2017-156112A.
Crowdsourcing-assisted Radio Environment Maps for V2V Communication Systems by Keita et al.
English Specification of 10-1442703.
English Specification of 2002-214324.
English Specification of 10-1131049.
English Specification of 10-2017-0049489.
English Specification of 6384521.
English Specification of 10-2015-0083161.
English Specification of 10-1448268.
English Specification of 10-2004-0074579.

MOTOR VEHICLES ONLY     TURN RIGHT     U-TURN

SAFETY SPEED     TOW AWAY ZONE     ROAD CONDITION (a)

(b)

1110   1120   1130

APPARATUS AND METHOD FOR GENERATING DISTRIBUTION INFORMATION ABOUT POSITIONING DIFFERENCE BETWEEN GNSS POSITIONING AND PRECISE POSITIONING BASED ON IMAGE AND HIGH-DEFINITION MAP

CROSS-REFERENCE TO RELATED APPLICATION(S)

This application is based on and claims priority under 35 U.S.C. 119 to Korean Patent Application No. 10-2019-0112767, filed on Sep. 11, 2019, in the Korean Intellectual Property Office, the disclosure of which is herein incorporated by reference in its entirety.

TECHNICAL FIELD

Embodiments of the disclosure relate to an apparatus and method for generating distribution information for a positioning difference between global navigation satellite system (GNSS) location information and precise positioning information based on an image and a high-definition map, and more specifically, an apparatus and method that calculates a positioning difference between precise positioning information, which is obtained by matching facility objects in the image with objects on a high-definition map, and GNSS positioning information, which is obtained based on a GNSS, and distributes distribution information including the calculated positioning difference, e.g., to other devices, over a communication network.

DESCRIPTION OF RELATED ART

A global navigation satellite system (GNSS) is a system designed to locate aircraft, vessels, or vehicles using satellites, and example GNSSs include the United States' global positioning system (GPS), Russia's global navigation satellite system (GLONASS), the European Union's Galileo, and China's BeiDou.

GNSSs may provide navigation to GNSS receiver-equipped vehicles based on location information for the vehicles.

Various types of error may degrade precision of GNSS positioning, which may include ionospheric and tropospheric errors, satellite clock errors, ephemeris data errors, receiver quality, multipath error, and dilution of precision (DOP), and the accuracy degradation may worsen in underground parking garages, tunnels, or downtown where satellite signal reception weakens.

As such, GNSS-based positioning information shows errors due to various factors, with the result of poor location-based services (LBSs).

There are some systems or apparatus which may reduce errors. However, such conventional systems or apparatus are costly and hence impracticable. Therefore, a need arises for technology capable of minimizing GNSS errors.

SUMMARY

An object of the disclosure is to provide a distribution information generating apparatus and method which may obtain image information including an image for facility objects by capturing facilities located around a road, obtain precise positioning information for the position of image capturing by matching the facility objects in the obtained image information with objects on a high-definition map, calculate a positioning difference between the GNSS positioning information for the capturing position and the precise positioning information for the capturing position, and distribute the positioning difference.

According to an embodiment, an apparatus for generating distribution information for a positioning difference between GNSS positioning information and a precise positioning information based on an image and a high-definition map comprises a global navigation satellite system (GNSS) receiver periodically generating GNSS information including GNSS positioning information and a positioning time, a camera unit fastened to a vehicle and generating image information including an image of at least one or more facility object, at the positioning time, while the vehicle drives, a storage unit storing a high-definition map including information for feature point spatial coordinates and a property for each facility object, and a controller performing control to obtain precise positioning information for a capturing position at the positioning time based on the image information, the high-definition map, and the GNSS information, calculating a positioning difference which is a difference between the GNSS positioning information and the precise positioning information, periodically generating distribution information, and distributing the distribution information to an outside. The distribution information includes the GNSS information, the positioning difference, and the precise positioning information.

The facility object may include at least one of a pavement marking, a warning sign, a regulatory sign, an mandatory sign, an additional sign, a traffic sign, a traffic control device, a traffic light, a street lamp, a road pole, a manhole, a curb, a median barrier, a fire hydrant, or a building.

The controller may include a map searching unit searching for at least one unique object present within an error radius of the GNSS receiver from a point corresponding to the GNSS positioning information on the high-definition map, an image searching unit recognizing and extracting a facility object corresponding to the searched-for unique object from the image information, a relative position obtaining unit analyzing the image information and calculating a position of a feature point of the extracted facility object, relative to the capturing position, a precise positioning information obtaining unit calculating precise positioning information for the capturing position based on the calculated relative position and feature point spatial coordinates of the searched-for unique object, and a distribution information generating unit obtaining a difference between the GNSS positioning information and the precise positioning information, calculating the positioning difference, and generating the distribution information.

The distribution information may further include information for transmission power.

The GNSS information may further include information for the number of GNSS satellite receptions.

Image areas corresponding to respective feature points of facility objects positioned in a region of interest (ROI) of a road surface in the image information may one-to-one correspond to relative coordinates of the objects on the high-definition map from the capturing position. The relative position obtaining unit may obtain a relative position of each point of the road surface to the capturing position considering a slope of the road surface and an angle of the camera.

According to an embodiment, a method for generating distribution information for a positioning difference between GNSS positioning information and a precise positioning information based on an image and a high-definition map may comprise periodically generating GNSS information including GNSS positioning information and a positioning time, generating image information including an image of at least one or more facility object, at the positioning time, while a vehicle drives, obtaining precise positioning information for a capturing position at the positioning time based on the image information, a high-definition map, and the GNSS information, calculating a positioning difference which is a difference between the GNSS positioning information and the precise positioning information, and generating distribution information including the GNSS information, the positioning difference, and the precise positioning information. The high-definition map includes information for feature point spatial coordinates and a property for each facility object.

The facility object may include at least one of a pavement marking, a warning sign, a regulatory sign, an mandatory sign, an additional sign, a traffic sign, a traffic control device, a traffic light, a street lamp, a road pole, a manhole, a curb, a median barrier, a fire hydrant, or a building.

Obtaining the precise positioning information may include searching for a unique object present within an error radius of the GNSS receiver from a point corresponding to the GNSS positioning information on the high-definition map, recognizing and extracting a facility object corresponding to the searched-for unique object from the image information, analyzing the image information and calculating a position of a feature point of the extracted facility object, relative to the capturing position, calculating precise positioning information for the capturing position based on the calculated relative position and feature point spatial coordinates of the searched-for unique object, obtaining a difference between the GNSS positioning information and the precise positioning information, calculating the positioning difference, and generating the distribution information.

The distribution information may further include information for transmission power.

The GNSS information may further include information for the number of GNSS satellite receptions.

Image areas corresponding to respective feature points of facility objects positioned in a region of interest (ROI) of a road surface in the image information may one-to-one correspond to relative coordinates of the objects on the high-definition map from the capturing position. Calculating the relative position may obtain a relative position of each point of the road surface to the capturing position considering a slope of the road surface and an angle of the camera.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
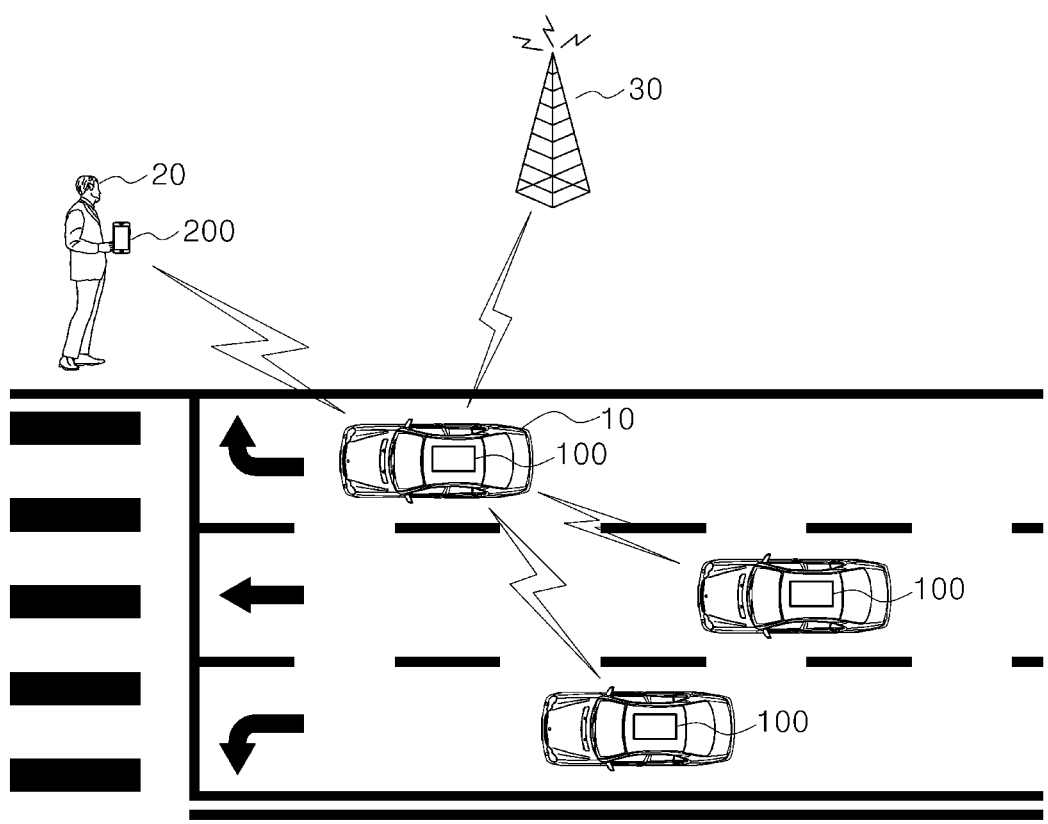
FIG. 1 is a view illustrating an example apparatus and method for generating distribution information for a positioning difference between GNSS positioning information and precise positioning information based on an image and a high-definition map according to an embodiment.

The terms as used herein are provided merely to describe some embodiments thereof, but not to limit the disclosure. The terms as used herein are provided merely to describe some embodiments thereof, but not to limit the scope of other embodiments of the disclosure. Unless otherwise defined, all terms including technical and scientific terms used herein have the same meaning as commonly understood by one of ordinary skill in the art to which the embodiments of the disclosure pertain and should not be interpreted as overly broad or narrow. As used herein, terms wrong or inappropriate for representing the spirit of the disclosure may be replaced with and understood as more proper ones to represent the spirit of the disclosure by one of ordinary skill in the art. General terms as used herein should be interpreted in the context of the specification or as defined in dictionaries.

As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the disclosure.

Hereinafter, exemplary embodiments of the inventive concept will be described in detail with reference to the accompanying drawings. The same reference denotations may be used to refer to the same or substantially the same elements throughout the specification and the drawings.

When determined to make the subject matter of the disclosure unclear, the detailed description of the known art or functions may be skipped. The accompanying drawings are provided for an easier understanding of the spirit of the reception but the disclosure should not be limited thereby.

Some terms as used herein may be defined as follows.

'Facility object' refers to a facility included in a high-definition map and includes at least one of pavement markings, warning signs, regulatory signs, mandatory signs, additional signs, traffic signs, traffic control devices, traffic lights, street lamps, road poles, manholes, curbs, median barriers, fire hydrants, and/or buildings.

'Facility object' may refer to any kind of facility that may be included in a high-definition map and its concept may encompass pavement markings, warning signs, regulatory signs, mandatory signs, additional signs, traffic signs, traffic control devices, traffic lights, street lamps, road poles, manholes, curbs, median barriers, fire hydrants, and/or buildings. For example, road center lines, solid road lines, broken road lines, turn-left arrows, drive straight ahead arrows, slow-down diamond-shaped markings, speed limit zone markings, or any other various kinds of pavement markings which may be painted on the road, street lamps, road poles, manholes, fire hydrants, curbs, median barriers, sign boards, or any other various road structures which are installed on the road and various signs or markings on the structures, traffic control devices or traffic lights, various kinds of signs or markings on traffic control devices or traffic lights, and buildings may belong to facility objects.

'High-definition map' refers to a map information database which includes and stores the respective properties (or attributes) of facility objects and spatial coordinate information for the feature points of facility objects. The respective feature points of facility objects included in the high-definition map may correspond to spatial coordinate information for the feature points in a one-to-one correspondence manner. 'Feature point of a facility object' refers to a featuring point of the facility object. For example, a vertex, center point, or a line of a facility object may be a featuring point of the facility object. 'High-definition map' refers to an electronic map that has been produced precisely with information for all the facility objects necessary for autonomous driving or location-based services, and high-definition maps may be used for various purposes, such as autonomous driving, road maintenance, traffic control, or asset management.

FIG. 1 is a view illustrating an example apparatus and method for generating distribution information for a positioning difference between GNSS positioning information and precise positioning information based on an image and a high-definition map according to an embodiment.

According to an embodiment of the disclosure, an apparatus and method for generating distribution information for a positioning difference between global navigation satellite system (GNSS) location information and precise positioning information which is based on an image and a high-definition map may calculate a positioning difference between precise positioning information and GNSS positioning information and distribute distribution information including the calculated positioning difference, e.g., to other devices, over a communication network. The precise positioning information may be obtained by matching facility objects in the image with objects on the high-definition map, and the GNSS positioning information may be obtained based on the GNSS. The apparatus for generating distribution information for a positioning difference between GNSS positioning information and precise positioning information may be simply referred to hereinafter as a "distribution information generating apparatus."

Referring to FIG. 1, a distribution information generating apparatus 100 may transmit the positioning difference-containing distribution information to vehicles driving around, mobile terminals 200, e.g., smartphones, of pedestrians walking around, and a communication relay 30 via a wireless communication network. As such, the distribution information generating apparatus 100 may transfer the distribution information to all terminals or devices which use GNSS-based location information around the distribution information generating apparatus 100 or all wireless communication-capable terminals or devices to obtain location information.

The terminals or devices receiving the distribution information may correct the GNSS-based location information using the positioning difference included in the distribution information, thereby minimizing GNSS errors, or the terminals or devices may position themselves even when there is no GNSS so that they are unable to grasp location information.

Figure 2:
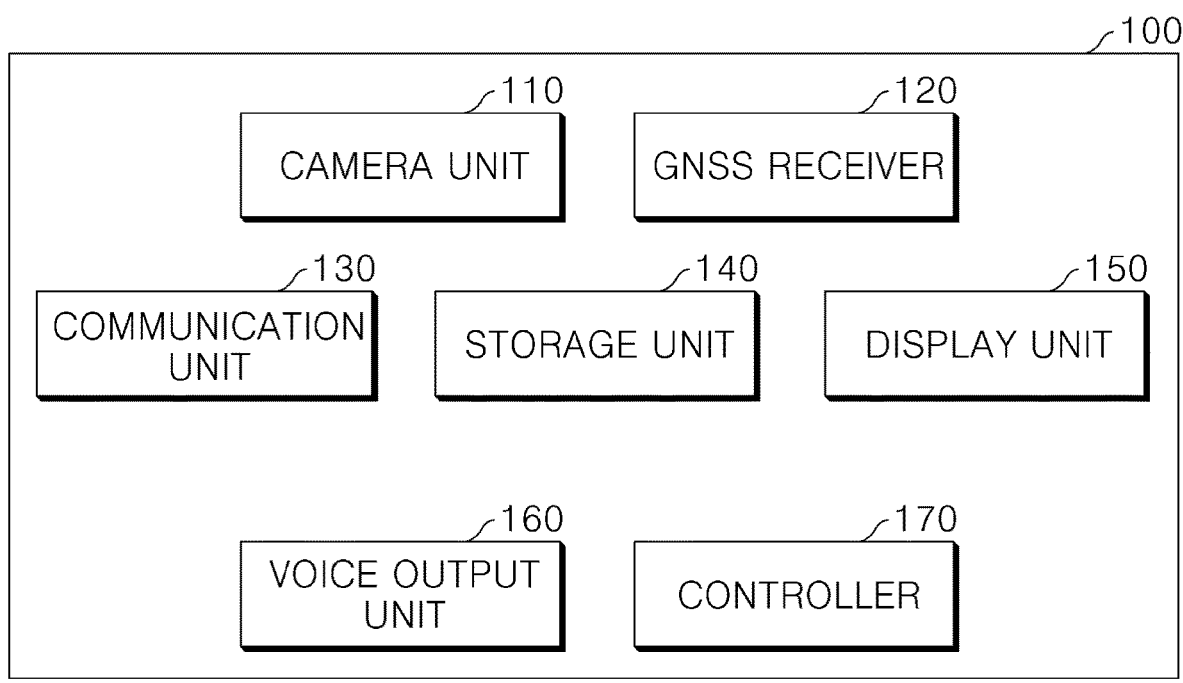
FIG. 2 is a block diagram illustrating a configuration of an apparatus for generating distribution information for a positioning difference between GNSS information and precise positioning information based on an image and a high-definition map according to an embodiment.

FIG. 2 is a block diagram illustrating a configuration of an apparatus for generating distribution information for a positioning difference between GNSS information and precise positioning information based on an image and a high-definition map according to an embodiment.

Referring to FIG. 2, a distribution information generating apparatus 100 includes at least one of a camera unit 110, a GNSS receiver 120, a communication unit 130, a storage unit 140, a display unit 150, a voice output unit 160, and a controller 170. According to an embodiment of the disclosure, however, the components shown in FIG. 2 are not essential components, and the distribution information generating apparatus 100 may be implemented with more or less components than those shown.

According to an embodiment, the distribution information generating apparatus 100 may be applicable to various terminals or devices, such as smartphones, portable terminals, mobile terminals, foldable terminals, personal digital assistants (PDAs), portable multimedia players (PMPs), telematics terminals, navigation terminals, personal computers, laptop computers, slate PCs, tablet PCs, ultrabook computers, wearable devices, such as smartwatches, smart glasses, head-mounted displays, etc., Wibro terminals, Internet protocol television (IPTV) terminals, smart TVs, digital broadcast terminals, audio video navigation (AVN) terminals, audio/video (A/V) systems, flexible terminals, or digital signage devices.

The distribution information generating apparatus 100 may be provided on one side of a mobile means. The mobile means may include at least one of vehicles, motorcycles, bicycles, or electric scooters.

The GNSS receiver 120 may periodically generate GNSS information. The GNSS information may include GNSS positioning information for positioning time and position of image capturing. The GNSS information may further include information about the number of GNSS satellite receptions. Thus, the GNSS positioning information may mean location information for the capturing position obtained by the GNSS receiver 120.

The position of image capturing may mean the position of the camera unit 110 which generates image information including the image of the facility object. Specifically, but as an example, the position of image capturing (or simply image capturing position) may mean the position of the center point of an image sensor of the camera unit 110. The units or modules may be integrated and used. The image capturing position may be obtained by correcting a difference in spatial coordinates between the GNSS receiver 120 and the camera unit 110 in the GNSS positioning information to calculate or obtain precise spatial information for the camera unit 110.

In other words, the GNSS receiver 120 may receive GNSS signals from satellites and perform calculation or computation on the received GNSS signals, thereby generating position data (or location information) for the GNSS receiver 120 at the positioning time.

The information about the number of GNSS satellite receptions is information for assisting a terminal receiving multiple pieces of distribution information in determining priority as to which one of the multiple pieces of distribution information the terminal is to first use. As the number of GNSS satellite receptions increases, the GNSS-based location information may be rendered more accurate. Thus, the terminal receiving the distribution information would first use the GNSS information which corresponds to more GNSS satellite receptions.

Signals received via the GNSS receiver 120 may be configured to provide the GNSS positioning information for the image capturing position to the distribution information generating apparatus 100 via various communication standards including 802.11 which is a set of wireless network standards or protocols including some infrared (IR) communications and wireless local area network (LAN) proposed by the Institute of Electrical and Electronics Engineers (IEEE), 802.15 which is a set of standards or protocols for wireless personal area network (PAN) including Bluetooth, ultra-wideband (UWB), and ZigBee, 802.16 which is a set of standards or protocols including broadband wireless access (BWA), metropolitan area network (MAN), and fixed wireless access (FWA), or 802.20 which is a set of mobile Internet standards or protocols for mobile broadband wireless access (MBWA) including WiMAX, wireless access in vehicular environments (WAVE), and Wibro.

The camera unit 110 may generate image information including images for at least one or more facility objects at the positioning time of the GNSS receiver 120 while the vehicle is driving. For example, generation of image information by the camera unit 110 may be synchronized with positioning by the GNSS receiver 120.

The camera unit 110 may process image frames or image data of still images or a video obtained by an image sensor (e.g., a camera module or a camera). The camera unit 110 may encode/decode image data obtained by the image sensor via CODEC to meet each specification, specification, or standard and may transmit the encoded/decoded image data to the communication unit 130. The processed image frames may be displayed on the display unit 150 under the control of the controller 170. As an example, the camera may capture an object (e.g., a facility) and output a video signal corresponding to the captured image (e.g., an image of the object).

The image frames processed by the camera unit 110 may be stored in the storage unit 140 or may be transmitted via the communication unit 130 to a server (not shown) or other terminals (not shown).

The camera unit 110 may provide a panoramic image (or panoramic image information) obtained (or captured) via a 360-degree camera (not shown) to the controller 170. The 360-degree camera may capture panoramic images or videos in two dimension (2D) or three dimension (3D). As used herein, the term "image" may encompass videos, but not only still images.

The camera unit 110 obtains image information (including, e.g., still images or video) for a specific area including one or more facility objects positioned around the road under the control of the controller 170.

'Facility object' may refer to any kind of facility that may be included in a high-definition map and its concept may encompass pavement markings, warning signs, regulatory signs, mandatory signs, additional signs, traffic signs, traffic control devices, traffic lights, street lamps, road poles, manholes, curbs, median barriers, fire hydrants, and/or buildings. For example, road center lines, solid road lines, broken road lines, turn-left arrows, drive straight ahead arrows, slow-down diamond-shaped markings, speed limit zone markings, or any other various kinds of pavement markings which may be painted on the road, street lamps, road poles, manholes, fire hydrants, curbs, median barriers, sign boards, or any other various road structures which are installed on the road and various signs or markings on the structures, traffic control devices or traffic lights, various kinds of signs or markings on traffic control devices or traffic lights, and buildings may belong to facility objects.

FIGS. 3, 4, 5, 6, and 7 are views illustrating example facilities according to an embodiment.

Figure 3:
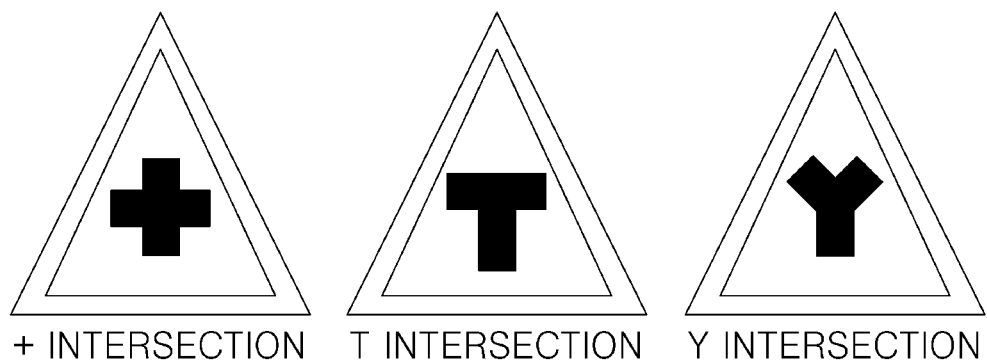
FIGS. 3, 4, 5, 6, and 7 are views illustrating example facilities according to an embodiment.

Referring to FIG. 3, warning signs may be traffic signs to indicate that the road condition may put road users in danger or there are dangerous things around. The warning signs may include at least one of signs of + intersection, T intersection, Y intersection, ⊣ intersection, ⊢ intersection, priority road, merge right, merge left, roundabout, railroad crossing, right curve, left curve, double bend first to right, double bend first to left, two-way traffic, steep hill upwards, steep hill downwards, road narrows, right lane ends, left lane ends, right hand traffic, left hand traffic, divided highway begins, divided highway ends, traffic signals, slippery road, river bank, uneven road, speed bump, falling or fallen rocks, zebra crossing, children at play, bicycle, road work ahead, low flying aircraft, side winds, tunnel ahead, bridge ahead, wild animals, danger, and traffic queues likely ahead.

Figure 4:
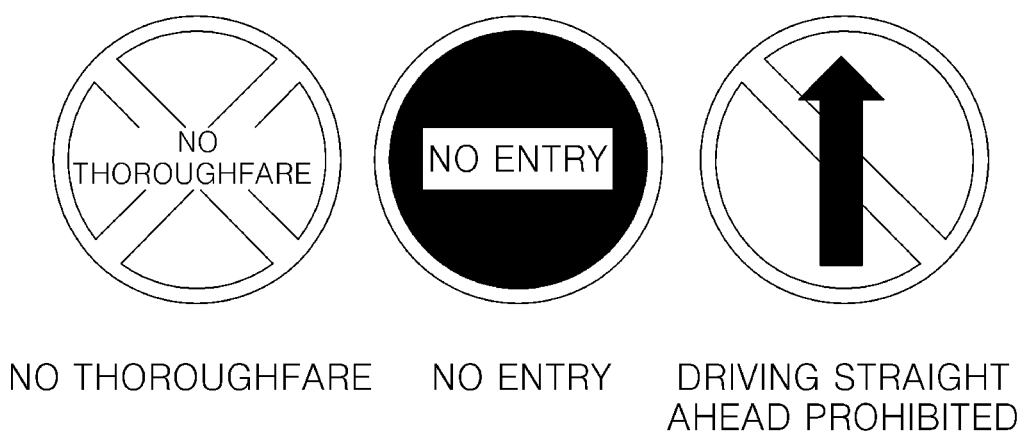

Referring to FIG. 4, the regulatory signs indicate regulations, such as various limits (e.g., speed limits) and prohibitions (e.g., no thoroughfare) for traffic safety purposes. The regulatory signs include at least one of signs of no thoroughfare, cars prohibited, trucks prohibited, vans prohibited, motorcycles and mopeds prohibited, motorcycles, mopeds, and cars prohibited, tractors, walking tractors, and hand carts prohibited, cyclists prohibited, no entry, drive straight ahead prohibited, turning right prohibited, turning left prohibited, turning around (U-turn) prohibited, do not pass, parking and stopping prohibited, trucks heavier than indicated prohibited, vehicles higher than indicated prohibited, vehicles wider than indicated prohibited, leaving less distance than indicated prohibited, maximum speed limit, minimum speed limit, slow down, stop, yield, pedestrians prohibited, and vehicles with dangerous goods prohibited.

Figure 5:
Figure 5:
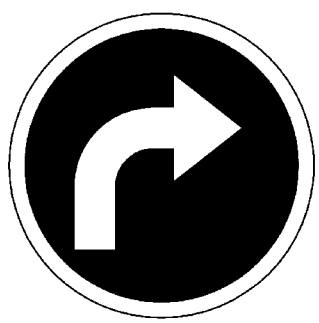
Figure 5:
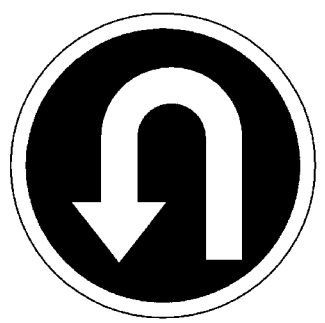

Referring to FIG. 5, the mandatory signs may be used for zebra crossings, bus-only lanes, or bike paths and may indicate information necessary for traffic safety, such as mandatory signs or lane use control signs. The mandatory signs include at least one of signs of mandatory lane for cars, mandatory path for cyclists, mandatory shared path for cyclists and pedestrians, roundabout, drive straight ahead, right turn, left turn, driving straight ahead or turning right, driving straight ahead or turning left, turning left or right, turning left or round, passing left or right, passing right, passing left, lane use control, detour, mandatory divided path for pedestrians and cyclists, parking lot, bicycle parking, mandatory paths for pedestrians, zebra crossing, children at play, elderly or handicap, mandatory lane for cyclists, crossing for cyclists, one way, permitted left turn, bus-only lane, high-occupancy vehicles lane, and priority over oncoming vehicles.

Figure 6:
Figure 6:
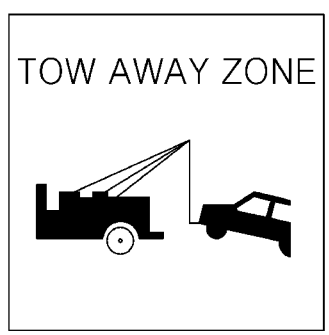
Figure 6:
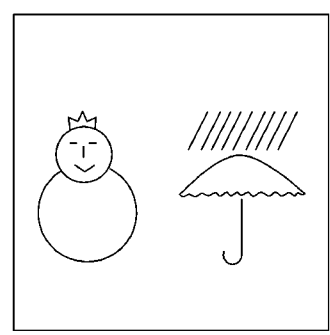

Referring to FIG. 6, the additional signs may be used to give road users specific information in addition to the warning, regulatory, and mandatory signs, e.g., to indicate times and distances permitted for parking zones and tow away zones. The additional signs include at least one of signs of distance, zone, date, time, priority over oncoming vehicles, safety speed, weather condition, road condition, traffic control, caution, sign description, zone begins, in zone, zone ends, right hand, left hand, forward, weight, road width, release, and tow away.

Figure 7:
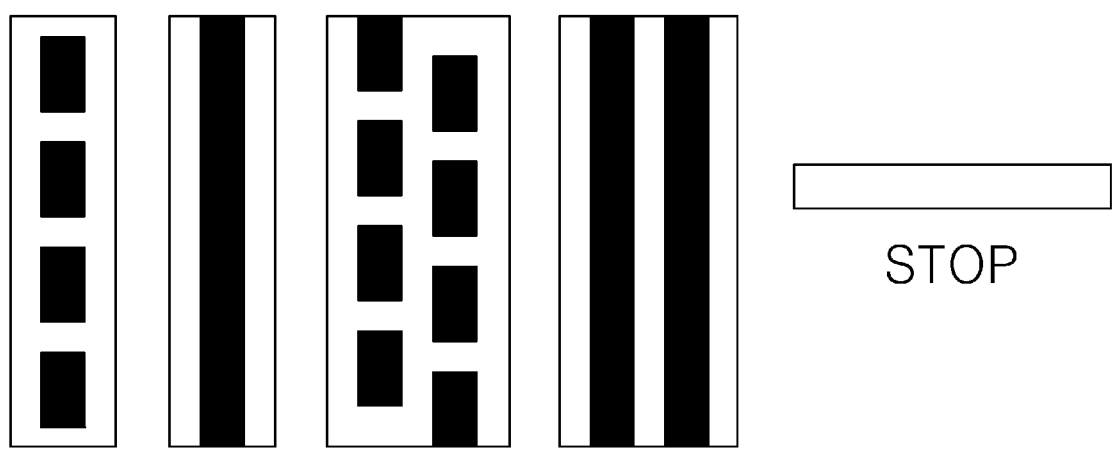

Referring to FIG. 7, the pavement markings may be used for informing road users of the content of traffic signs by symbols, letters, and lines for the purpose of traffic safety and may indicate, e.g., lanes, crosswalks, stop lines, and speed limits. The pavement markings include at least one of center lines, U-turn zones, lanes, bus-only lanes, no passing lines, road obstacles, turning right prohibited, turning left prohibited, driving straight ahead prohibited, driving straight ahead and turning left prohibited, driving straight ahead and turning right prohibited, turning left and right prohibited, turning around prohibited, parking prohibited, stopping and parking prohibited, speed limit, speed limit in children at play zone, slow down, stop, yield, parking, no stopping zone, direction lines, left turn directing extensions, roundabout yield lane, direction, pedestrian crossing ahead, stop line, safety zone, cyclists crossing, mandatory path for cyclists, cyclists have priority road, children at play, elderly zone, handicap zone, directing arrows, change lanes, and hill upwards.

The above-described pavement markings, warning signs, regulatory signs, mandatory signs, additional signs, kinds of signs, traffic control devices, and traffic lights are not limited to those shown in the drawings but, rather, any other various signs, symbols, or markings which may give road users information may be adopted for the same purpose.

Turning back to FIG. 2, the communication unit 130 may communicate with any components in the distribution information generating apparatus 100 via a wired/wireless communication network or may transmit distribution information to external terminals via a wireless communication network. The external terminals may include a server (not shown) or other terminals (not shown). Wireless Internet technology which may be adopted for transmission over the wireless communication network may include at least one of wireless LAN (WLAN), digital living network alliance (DLNA), wireless access in vehicular environments (WAVE), wireless broadband (Wibro), world interoperability for microwave access (WiMAX), high speed downlink packet access (HSDPA), high speed uplink packet access (HSUPA), IEEE 802.16, IEEE 802.11p, long-term evolution (LTE), LTE-advanced (LTE-A), LTE V2X (C'V2X), wireless mobile broadband service (WMBS), or 5G communication. The communication unit 130 may transmit or receive data according to at least one wireless Internet technology which may include not only the above-enumerated techniques but also other non-mentioned Internet techniques. Short-range communication techniques that may be adopted according to an embodiment may include Bluetooth, radio frequency identification (RFID), infrared data association (IrDA), ultra-wideband (UWB), ZigBee, near-field communication (NFC), ultrasound communication (USC), visible light communication (VLC), Wi-Fi, or Wi-Fi direct. Wired communication techniques that may be adopted according to an embodiment may include power line communication (PLC), universal serial bus (USB) communication, Ethernet, serial communication, or optical/coaxial cable communication.

The communication unit 130 may communicate information or data with any terminal via a USB.

The communication unit 130 transmits or receives wireless signals to/from base stations, the server, or the other terminals over a mobile communication network established as per mobile communication standards, protocols, or schemes, such as global system for mobile communication (GSM), code division multiple access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), or LTE-advanced (LTE-A).

The communication unit 130 broadcasts the distribution information via wireless communication to the surroundings or outside (e.g., other terminals, servers, relays, or base stations) under the control of the controller 170. The outside base stations, relays, servers, or other terminals may correct the GNSS-based positioning information using the received distribution information.

As described below, the distribution information may include GNSS information, precise positioning information, and a positioning difference between the GNSS positioning information and the precise positioning information, and the distribution information may further include transmission power information. The GNSS information may include information for the GNSS positioning information and the time of positioning, and the GNSS information may further include information about the number of GNSS satellite receptions.

The storage unit 140 stores a high-definition map including information for properties and feature point spatial coordinates for each facility object. The high-definition map may mean, or include, a database storing the respective properties (or attributes) of all the facility objects and absolute spatial coordinates of the feature points of the facility objects. 'Feature point of a facility object' refers to a featuring point of the facility object. For example, a vertex, center point, or a line of a facility object may be a featuring point of the facility object. 'High-definition map' refers to an electronic map that has been produced precisely with information for all the facility objects necessary for autonomous driving or location-based services, and high-definition maps may be used for various purposes, such as autonomous driving, road maintenance, traffic control, or asset management.

The storage unit 140 stores various user interfaces (UIs) and graphic user interfaces (GUIs).

The storage unit 140 stores at least one program and data necessary for the distribution information generating apparatus 100 to operate.

For example, the storage unit 140 may store a plurality of application programs (or simply applications) which may run on the distribution information generating apparatus 100 and data and instructions for operations of the distribution information generating apparatus 100. At least some of the application programs may be downloaded from an external server via wireless communication. At least some of the application programs may be installed on the distribution information generating apparatus 100 before the distribution information generating apparatus 100 come out on the market so as to be able to perform basic or default functions of the distribution information generating apparatus 100. The application programs may be stored in the storage unit 140 and be installed on the distribution information generating apparatus 100 and may be driven to perform operations (or functions) of the distribution information generating apparatus 100 according to an embodiment.

The storage unit 140 may include at least one type of storage medium of flash memory types, hard disk types, multimedia card micro types, card types of memories (e.g., SD or XD memory cards), RAMs (Random Access Memories), SRAMs (Static Random Access Memories), ROMs (Read-Only Memories), EEPROMs (Electrically Erasable Programmable Read-Only Memories), PROMs (Programmable Read-Only Memories), magnetic memories, magnetic disks, or optical discs. According to an embodiment, the distribution information generating apparatus 100 may operate web storage which performs the storage function of the storage unit 140 over the Internet or may operate in association with the web storage.

The storage unit 140 stores GNSS information at each positioning time, precise positioning information at the positioning time, the positioning difference at the positioning time, and distribution information at the positioning time.

The display unit 150 may display various contents, e.g., various menu screens, using the UI and/or GUI stored in the storage unit 140 under the control of the controller 170. The contents displayed on the display unit 150 include a menu screen including various pieces of text or image data (including various information data), icons, a list menu, combo boxes, or other various pieces of data. The display unit 150 may be a touchscreen.

The display unit 150 may include at least one of a liquid crystal display (LCD), a thin film transistor-liquid crystal display (TFT-LCD), an organic light-emitting diode (OLED), a flexible display, or a three-dimensional (3D) display, an e-ink display, or a light emitting diode (LED) display.

The display unit 150 displays GNSS information at each positioning time, precise positioning information at the positioning time, the positioning difference at the positioning time, and distribution information at the positioning time under the control of the controller 170.

The voice output unit 160 outputs voice information included in a signal signal-processed by the controller 170. The sound output unit 160 may include, e.g., a receiver, a speaker, and a buzzer.

The voice output unit 160 outputs a guide (or instruction) voice generated by the controller 170.

The voice output unit 160 outputs voice information (or sound effect) corresponding to GNSS information at each positioning time, precise positioning information at the positioning time, the positioning difference at the positioning time, and distribution information at the positioning time under the control of the controller 170.

The controller 170 may include a microcontroller unit (MCU) or a processor. The controller 170 controls the overall function or operation of the distribution information generating apparatus 100.

The controller 170 controls the overall function or operation of the distribution information generating apparatus 100 using the program and data stored in the storage unit 140. The controller 170 may include a RAM, a ROM, a central processing unit (CPU), a graphics processing unit (GPU), and a bus, and the RAM, ROM, CPU, and GPU may be interconnected via the bus. The controller 170 may access the storage unit 140 and boot up using an operating system (OS) stored in the storage unit 140, and the controller 170 may perform various operations using various programs, contents, and data stored in the storage unit 140. The controller 170 may set or adjust the screen or environment depending on information input via various input device interfaces.

The controller 170 obtains precise positioning information which is a precise position for the capturing position at the positioning time for the GNSS information based on the GNSS information and the high-definition map and image information obtained by the camera unit 110. The controller 170 may calculate or obtain a positioning difference which is a difference between the GNSS positioning information and the precise positioning information and perform control to periodically generates distribution information including the positioning difference, and externally distribute the distribution information.

Figure 8:
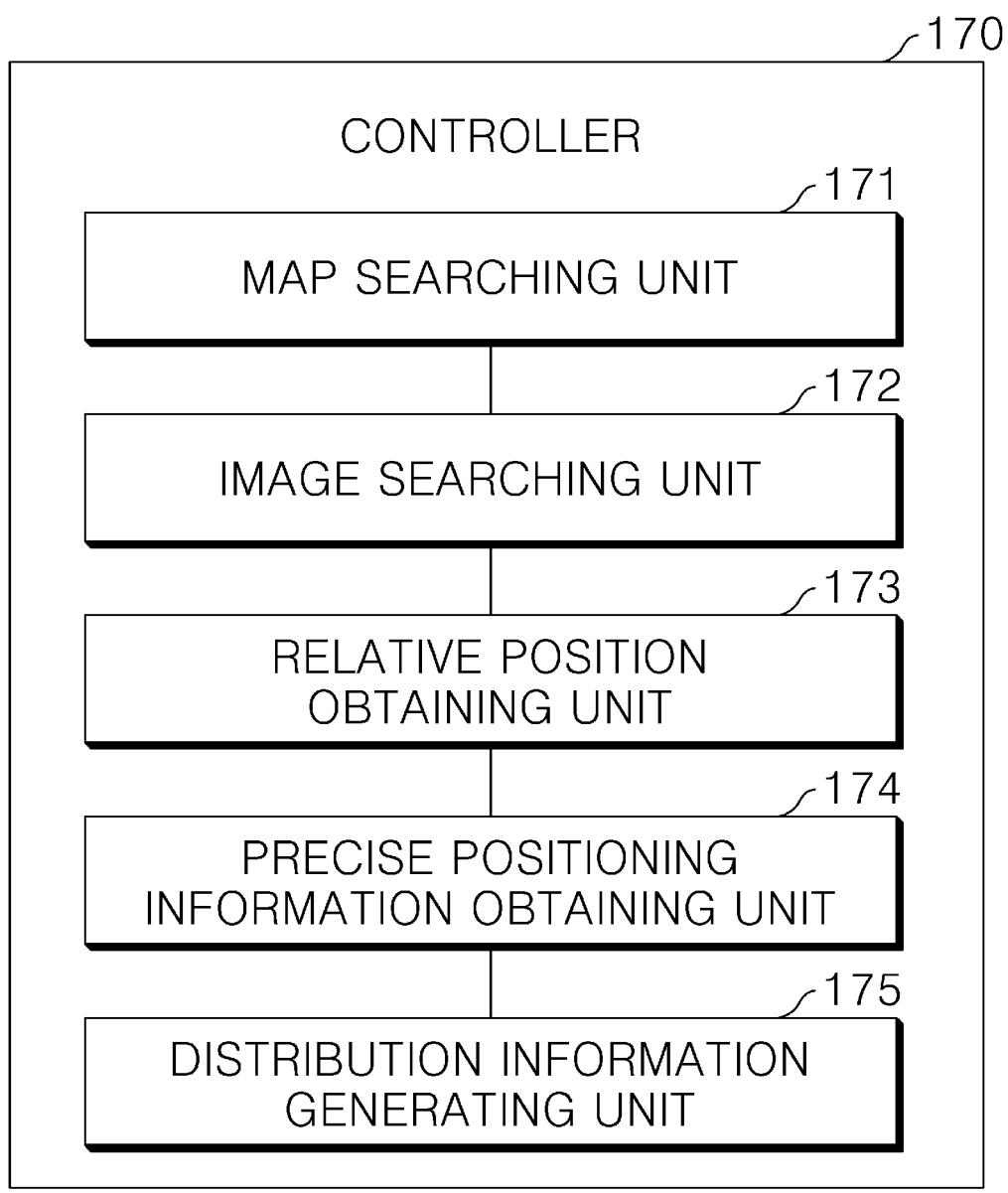
FIG. 8 is a block diagram illustrating a controller according to an embodiment.

FIG. 8 is a block diagram illustrating a controller according to an embodiment.

Referring to FIG. 8, the controller 170 includes at least one of a map searching unit 171, an image searching unit 172, a relative position obtaining unit 173, a precise positioning information obtaining unit 174, and a distribution information generating unit 175.

The map searching unit 171 searches for or identifies a unique object present within an error radius of the GNSS receiver from the point corresponding to the GNSS positioning information of the GNSS information on the high-definition map.

The unique object means a facility object with a unique property (or attribute) as compared with the other facility objects. For example, dotted road lines have objects with the same property repeated every predetermined distance and, thus, are not unique objects. However, left-turn or U-turn markings on the road surface may be solely present in predetermined zones and may thus be regarded as unique objects. Although several left-turn or U-turn markings are present within the error radius, they might not be unique objects, if there is a facility object with a unique property within the error radius of the GNSS receiver 120 from the point corresponding to the GNSS positioning information, the object may be regarded as a unique object. A combination of a plurality of facility objects, as in the case where a drive through marking and a turning right marking are shown together, may be determined to be a unique object.

The error radius (e.g., 25 m to 30 m) of the GNSS receiver may be determined depending on the kind or characteristics of the GNSS receiver 120.

If a unique object present within the error radius of the GNSS receiver 120 from the point corresponding to the GNSS positioning information is detected, the image searching unit 172 recognizes and extracts the facility object corresponding to the detected unique object from the image information.

The image searching unit 172 analyzes the image information and extracts the facility object corresponding to the detected unique object using various imaging algorithms. The image searching unit 172 may use machine learning or deep learning. The image searching unit 172 may analyze, e.g., the property and shape of the facility object, thereby precisely extracting the facility object corresponding to the detected unique object from the image information.

The relative position obtaining unit 173 analyzes the image information, thereby calculating or obtaining the relative position for the feature point of the extracted facility object with respect to the capturing position.

The precise positioning information obtaining unit 174 calculates or obtains precise positioning information for the capturing position based on the obtained relative position and feature point spatial coordinates of the detected unique object. The spatial coordinates of the feature point of the unique object may easily be obtained from the high-definition map. Thus, the precise positioning information obtaining unit 174 may obtain the precise positioning information which is precise location information for the capturing position by reversely obtaining the relative position obtained from the feature point spatial coordinate of the unique object. Thus, the precise positioning information may mean precise location information for the capturing position obtained by matching the object on the high-definition map with the facility object.

Then, the distribution information generating unit 175 obtains the positioning difference which is the difference between the GNSS positioning information and the precise positioning information and generates distribution information. The distribution information includes the GNSS information, the positioning difference, and the precise positioning information. The distribution information may further include information for transmission power. The GNSS information, positioning difference, precise positioning information, and information for the transmission power of the distribution information, which are included in the distribution information, are pieces of information time-synchronized with the positioning time of the GNSS information.

The information for the transmission power of the distribution information is information for assisting a terminal receiving multiple pieces of distribution information in determining priority as to which one of the multiple pieces of distribution information the terminal is to first use. The transmission power information for the distribution information is used to calculate the distance between the terminal (e.g., the distribution information generating apparatus 100) which transmits the distribution information and the terminal (e.g., an external terminal) which receives the distribution information. The external terminal receiving the distribution information may calculate the distance to the distribution information generating apparatus 100 which transmits the distribution information by comparing the transmission power of the distribution information and the strength of the received distribution additional signal, and the external terminal may first use the distribution information for which the distance of transmission is shortest.

As the GNSS receiver 120 periodically generates GNSS information, and the camera unit 110 periodically generates image information in synchronization with the positioning time of the GNSS information, the component 171 to 175 of the controller 170 periodically perform their respective functions or operations to thereby generate distribution information in synchronization with the positioning time of the GNSS information. The generated distribution information is transferred via the communication unit 130 to other vehicles or external mobile terminals.

The controller 170 may output the generated distribution information via the display unit 150 and/or voice output unit 160.

A method for generating distribution information for a positioning difference between GNSS positioning information and precise positioning information based on an image and a high-definition map according to an embodiment is described below with reference to FIGS. 1 to 14.

Figure 9:
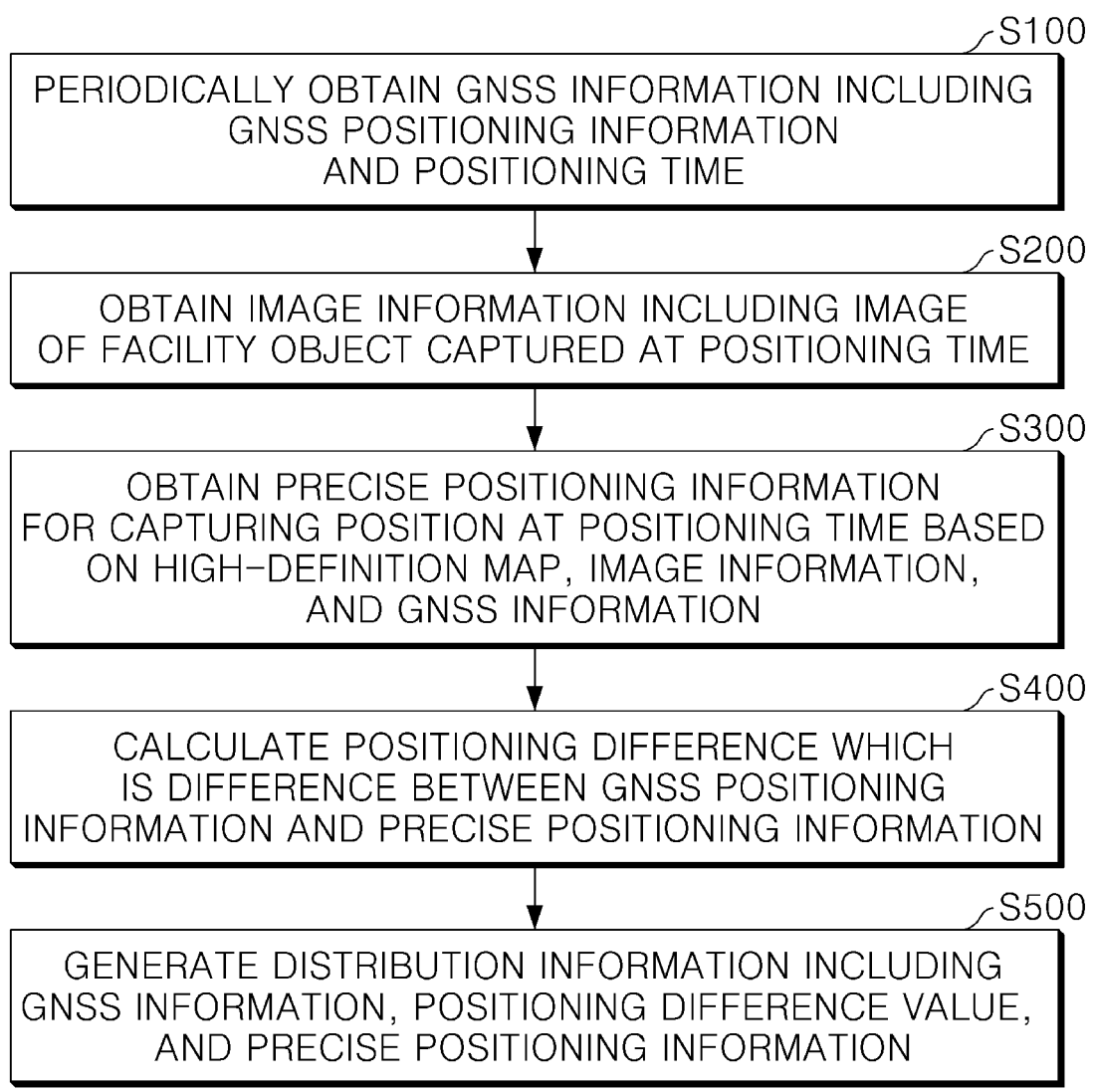
FIG. 9 is a flowchart illustrating an example method for generating distribution information for a positioning difference between GNSS positioning information and precise positioning information based on an image and a high-definition map according to an embodiment.

FIG. 9 is a flowchart illustrating an example method for generating distribution information for a positioning difference between GNSS positioning information and precise positioning information based on an image and a high-definition map according to an embodiment.

According to an embodiment, the distribution information generation method may be performed by the distribution information generating apparatus 100.

IF the GNSS receiver 120 periodically generates GNSS information including a positioning time and GNSS positioning information, the controller 170 periodically obtains the GNSS information from the GNSS receiver 120 (S100).

The camera unit 110 may generate image information including images for at least one or more facility objects at the positioning time of the GNSS receiver 120 while the vehicle is driving. For example, generation of image information by the camera unit 110 may be synchronized with positioning by the GNSS receiver 120. For example, the camera unit 110 may generate image information including images for at least one or more facility objects in synchronization with the positioning time of the GNSS receiver 120 while the vehicle is driving. If the image information is generated by the camera unit 110, the controller 170 obtains the image information captured in synchronization with the positioning time while the vehicle drives from the camera unit 110 (S200).

The controller 170 obtains precise positioning information for the capturing position at the positioning time based on the GNSS information, the image information, and the high-definition map (S300).

The controller 170 calculates a positioning difference which is a difference between the GNSS positioning information and the precise positioning information (S400).

The controller 170 generates distribution information including the GNSS information, the positioning difference, and the precise positioning information (S500). The distribution information may further include information for transmission power, and the generated distribution information may be transferred via the communication unit 130 to the outside. The GNSS information, positioning difference, precise positioning information, and information for the transmission power of the distribution information, which are included in the distribution information, are pieces of information time-synchronized with the positioning time of the GNSS information.

Figure 10:
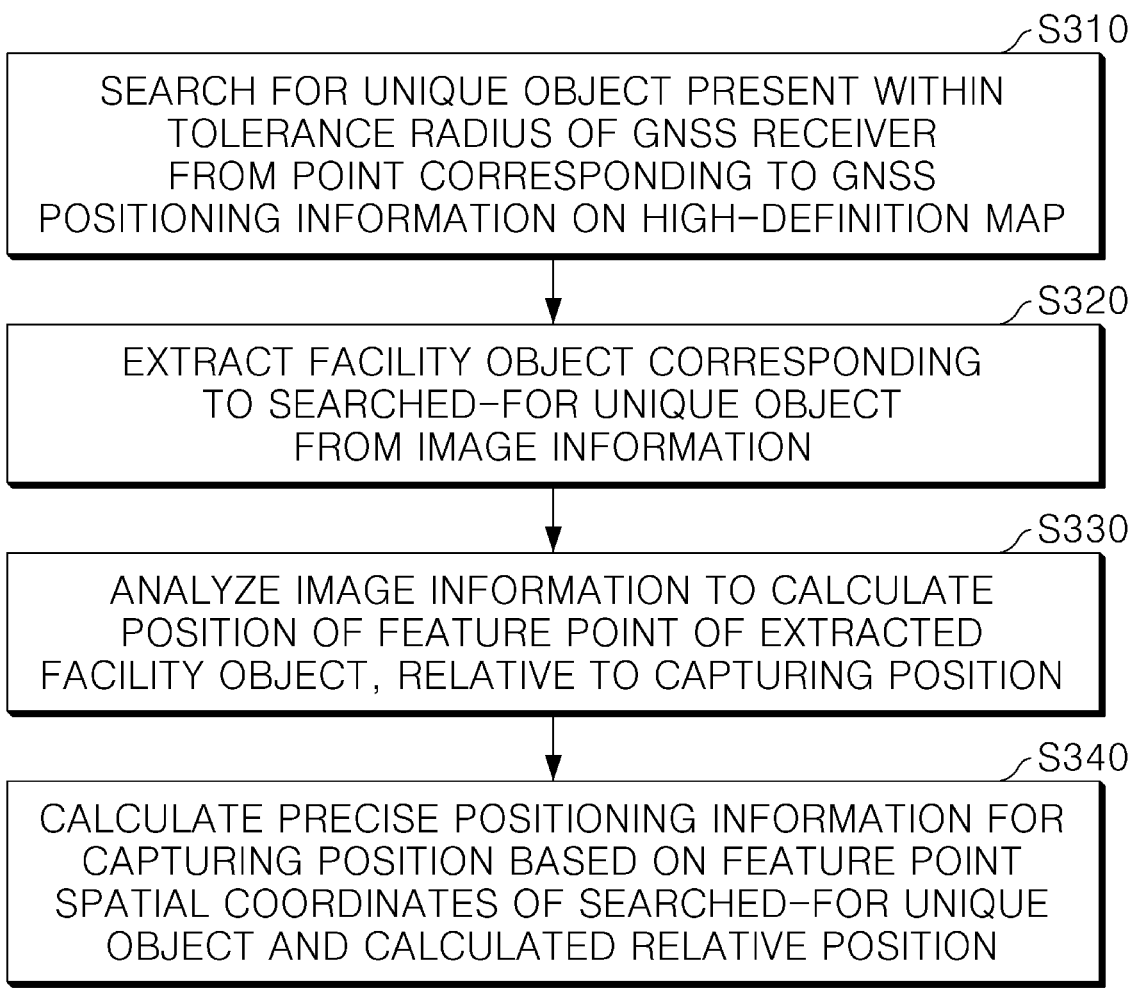
FIG. 10 is a flowchart illustrating an example step of obtaining precise positioning information according to an embodiment.

FIG. 10 is a flowchart illustrating an example step of obtaining precise positioning information according to an embodiment.

The controller 170 detects a unique object present within an error radius of the GNSS receiver from the point corresponding to the GNSS positioning information of the GNSS information on the high-definition map (S310).

Figure 11:
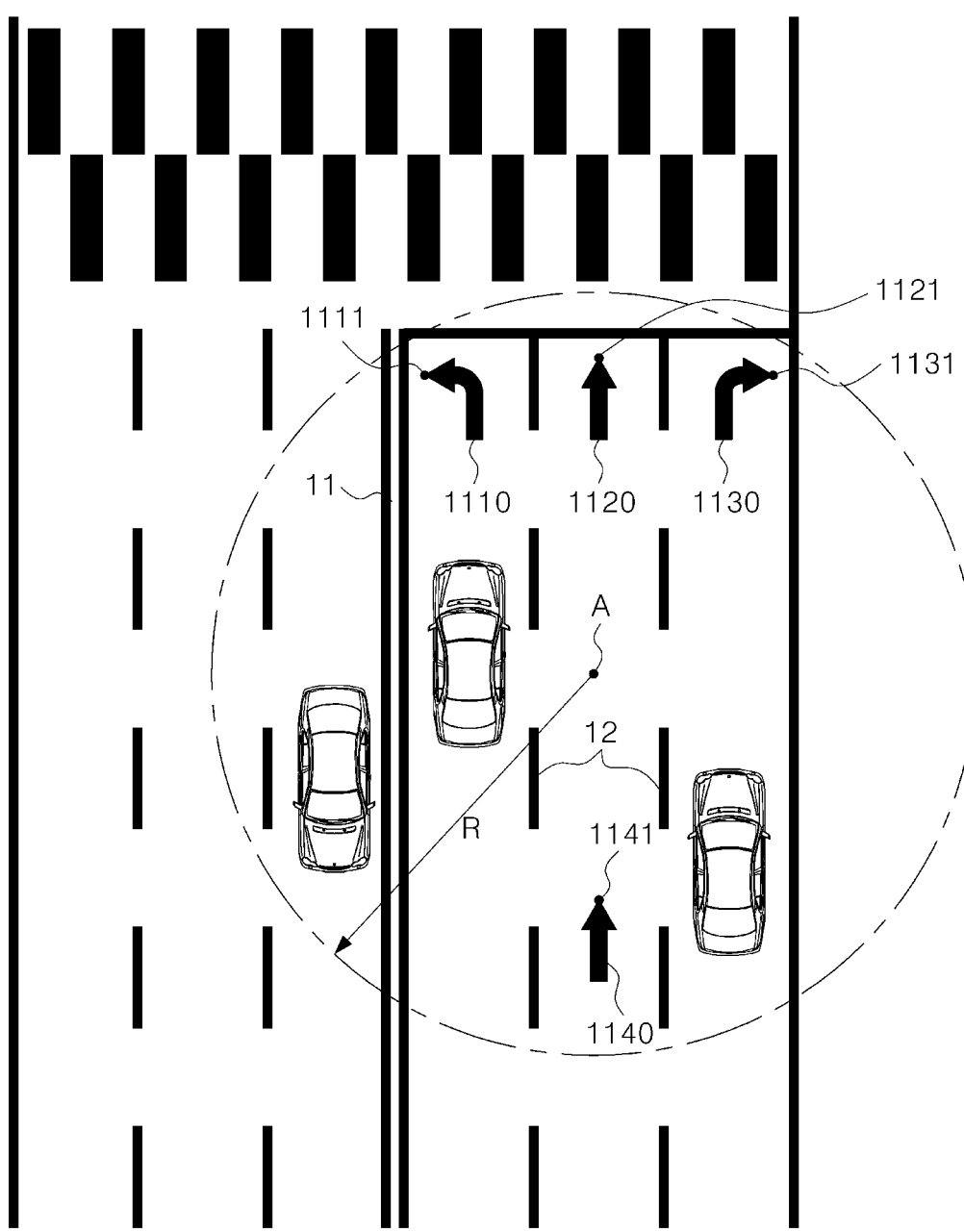
FIG. 11 is a view illustrating an example step of searching for a unique object according to an embodiment.

FIG. 11 is a view illustrating an example step of searching for a unique object according to an embodiment.

Referring to FIG. 11, facility objects, such as a turn left arrow 1110, drive straight ahead arrows 1120 and 1140, a turn right arrow 1130, a stop line 1121, double solid center lines 11, and a broken line 12, are present within the error radius R of the GNSS receiver 120 from the point A corresponding to the GNSS positioning information of the GNSS information.

Since the center lines 11 and the broken line 12 are repeated, they may not be unique objects. Since the turn left arrow 1110 and the turn right arrow 1130 are objects with a unique property within the error radius, they may be unique objects.

Since there are two drive straight ahead arrows 1120 and 1140 within the error radius, they individually may not be unique objects. However, the front drive straight ahead arrow 1120, if combined with the stop line 1121, may be distinguished from the rear drive straight ahead arrow 1140, both the drive straight ahead arrows 1120 and 1140 may be regarded as unique objects.

If the unique object is detected, the controller 170 may recognize and extract the facility object corresponding to the detected unique object from the image information (S320). The controller 170 may analyze, e.g., the property, kind, or shape of the facility using various imaging algorithms and may precisely extract the facility object corresponding to the detected unique object from the image information.

After extracting the facility object corresponding to the detected unique object from the image information, the controller 170 analyzes the image information and calculates or obtains the relative position for the feature point of the facility object extracted from the image information with respect to the capturing position.

The controller 170 obtains the precise positioning information for the capturing position based on the relative position from the capturing position to the extracted facility object and the spatial coordinates of the extracted facility object (S340).

Figure 12:
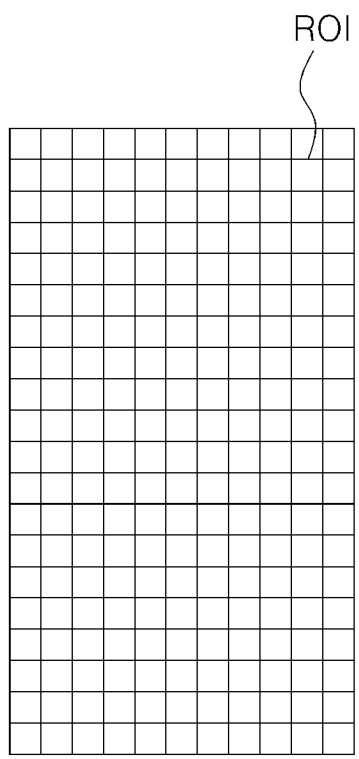
FIGS. 12, 13, and 14 are views illustrating an example step of calculating a position of a feature point of a facility object, relative to a capturing position according to an embodiment.
Figure 12:
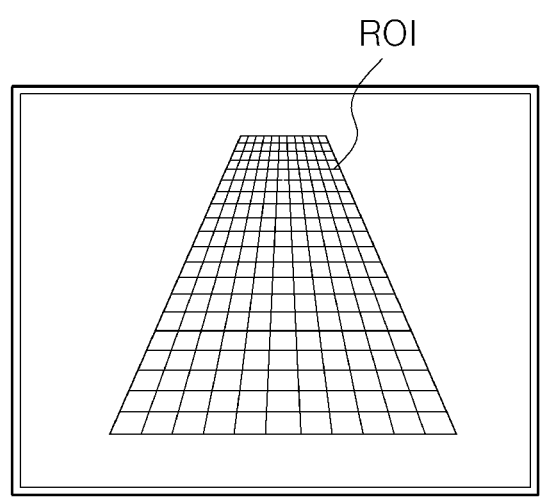
Figure 12:
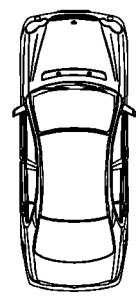
Figure 13:
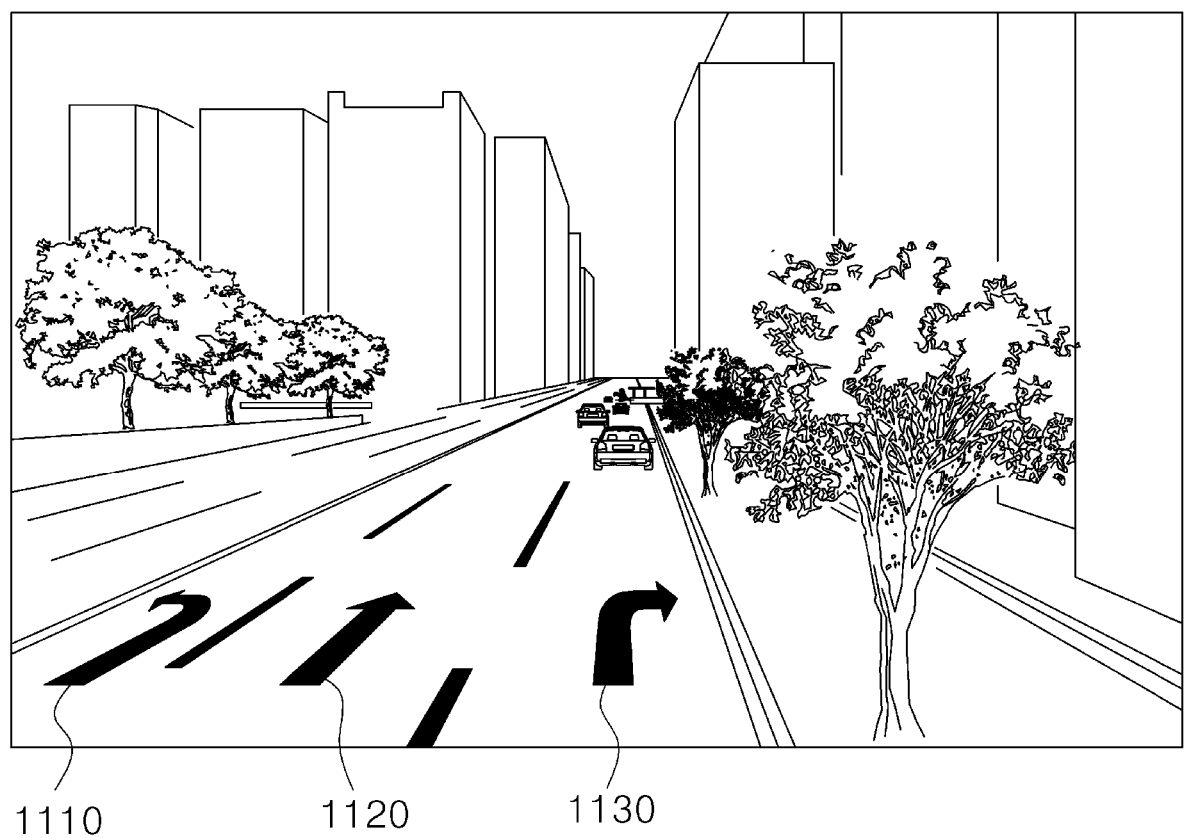
Figure 14:
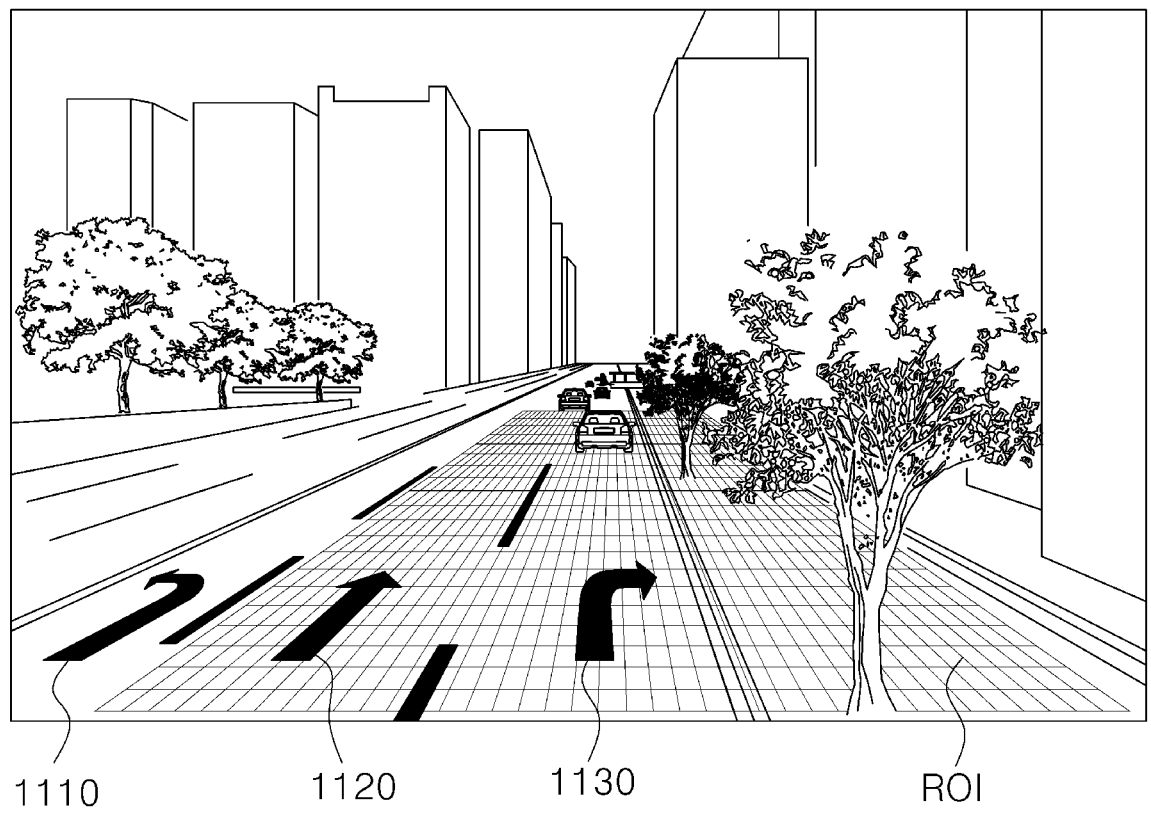

FIGS. 12, 13, and 14 are views illustrating an example step of calculating a position of a feature point of a facility object, relative to a capturing position according to an embodiment.

(a) of FIG. 12 illustrates a region of interest (ROI) ahead of a vehicle at top view, and (b) of FIG. 12 illustrates the ROI as viewed through a camera.

Referring to (a) of FIG. 12, the grid shown on the ground is a virtual grid, and the crossings match spatial coordinates. As viewed through a camera, the grid may be shown as in (b) of FIG. 12. The grid may be configured to measure 3 m×3 m or 3 m×5 m for a downtown road but, without limitations, may be configured in other various sizes.

Under the assumption that the road is flat and the camera is fixed and stationary, each point of the bottom part, e.g., the road surface, in the image information matches spatial coordinates in a one-to-one correspondence manner. Since the camera is fixed and stationary, the relative position of each point of the road, relative to the capturing position of the camera, may be determined. Thus, analysis of the image information captured by the camera may produce the relative position of each point of the road bottom relative to the capturing position of the camera. If the spatial coordinates of the feature point of a specific facility object in the image information are known, the capturing position of the camera may be figured out based on the relative position obtained from the image information and the spatial coordinates of the feature point. The slope of the road and pose information for the camera may also be grasped. Thus, the relative position of each point of the road relative to the capturing position of the camera may be obtained also based on the slope and the pose information.

The image areas corresponding to the respective feature points of facility objects positioned in a region of interest (ROI) of the road surface in the image information one-to-one correspond to the relative positions of the objects with respect to the capturing position on the high-definition map.

Embodiments of the disclosure take advantage of this idea. Since the spatial coordinates of the feature point of the facility object positioned on the road surface may be grasped from the high-definition map, the precise positioning information which is the capturing position of the camera may be obtained in a precise manner.

The ROI shown in FIGS. 12(a) and (b) is merely an example, and embodiments of the disclosure are not limited thereto. Each point of the road surface in the image information may match spatial coordinates in a one-to-one correspondence manner. The scheme of grasping the relative positions of objects with respect to the capturing position in the image information may also apply to facility objects with a height, as well as to facility objects marked on the road surface.

However, as compared with grasping the relative positions of facility objects with a height, grasping the relative positions of facility objects marked on the road surface may enable obtaining precise positioning information more accurately while reducing the computation loads.

FIG. 13 illustrates example image information captured by a camera unit mounted on a vehicle. FIG. 14 is a view illustrating ROI-applied image information.

Referring to FIGS. 13 and 14, the image information obtained by the camera includes facility objects, such as a center line, broken lines, a turn left arrow, a drive straight ahead arrow 1120, and a turn right arrow 1130.

In the hypothesis that the turn left arrow 1110, the drive straight ahead arrow 1120, and the turn right arrow 1130 are unique objects detected by the detection of FIG. 11, the controller 170 may analyze the image information and recognize and extract the facility objects, e.g., the turn left arrow 1110, drive straight ahead arrow 1120, and turn right arrow 1130 from the image information. If processing the ROI alone, the controller 170 may extract the drive straight ahead arrow 1120 and the turn right arrow 1130.

The controller 170 calculates or obtains the relative positions of the feature points of the facility objects 1120 and 1130, which have been extracted by analyzing the image information, from the position of capturing.

Since the absolute spatial coordinates of the feature points of the unique objects 1110, 1120, and 1130 are included in the high-definition map, the controller 170 obtains precise positioning information for the capturing position based on the relative positions of the feature points of the facility objects 1120 and 1130 from the capturing position and the spatial coordinates of the feature points of the unique objects 1120 and 1130.

As described above, embodiments of the disclosure may obtain image information including an image for one or more facility objects positioned around a road, obtain precise positioning information for the position of image capturing based on, e.g., GNSS positioning information for the image capturing position, the high-definition map, and the obtained image information, calculate a positioning difference between the GNSS positioning information for the image capturing position and the precise positioning information at the image capturing position, and distribute the positioning difference to the outside. Receiving the positioning difference, a terminal may correct the GNSS-based GNSS positioning information using the positioning difference, thereby enhancing the accuracy of the current location information.

The above-described embodiments are merely examples, and it will be appreciated by one of ordinary skill in the art various changes may be made thereto without departing from the scope of the disclosure. Accordingly, the embodiments set forth herein are provided for illustrative purposes, but not to limit the scope of the disclosure, and should be appreciated that the scope of the disclosure is not limited by the embodiments. The scope of the disclosure should be construed by the following claims, and all technical spirits within equivalents thereof should be interpreted to belong to the scope of the disclosure.

What is claimed is:

1. An apparatus for generating distribution information for a positioning difference between GNSS positioning information and a precise positioning information based on an image and a high-definition map, the apparatus comprising:

a global navigation satellite system (GNSS) receiver periodically generating GNSS information including GNSS positioning information and a positioning time;

a camera unit fastened to a vehicle and generating image information including an image of at least one or more facility object, at the positioning time, while the vehicle drives;

a storage unit storing a high-definition map including information for feature point spatial coordinates and a property for each facility object; and a controller performing control to obtain precise positioning information for a capturing position at the positioning time based on the image information, the high-definition map, and the GNSS information, calculating a positioning difference which is a difference between the GNSS positioning information and the precise positioning information, periodically generating distribution information, and distributing the distribution information to an outside, wherein the distribution information includes the GNSS information, the positioning difference, and the precise positioning information.

2. The apparatus of claim 1, wherein the facility object includes at least one of a pavement marking, a warning sign, a regulatory sign, an mandatory sign, an additional sign, a traffic sign, a traffic control device, a traffic light, a street lamp, a road pole, a manhole, a curb, a median barrier, a fire hydrant, or a building.

3. The apparatus of claim 1, wherein the controller includes a map searching unit searching for at least one unique object present within an error radius of the GNSS receiver from a point corresponding to the GNSS positioning information on the high-definition map, an image searching unit recognizing and extracting a facility object corresponding to the searched-for unique object from the image information, a relative position obtaining unit analyzing the image information and calculating a position of a feature point of the extracted facility object, relative to the capturing position, a precise positioning information obtaining unit calculating precise positioning information for the capturing position based on the calculated relative position and feature point spatial coordinates of the searched-for unique object, and a distribution information generating unit obtaining a difference between the GNSS positioning information and the precise positioning information, calculating the positioning difference, and generating the distribution information.

4. The apparatus of claim 1, wherein the distribution information further includes information for transmission power.

5. The apparatus of claim 1, wherein the GNSS information further includes information for the number of GNSS satellite receptions.

6. The apparatus of claim 3, wherein image areas corresponding to respective feature points of facility objects positioned in a region of interest (ROI) of a road surface in the image information one-to-one correspond to relative coordinates of the objects on the high-definition map from the capturing position, and wherein the relative position obtaining unit obtains a relative position of each point of the road surface to the capturing position considering a slope of the road surface and an angle of the camera.

7. A method for generating distribution information for a positioning difference between GNSS positioning information and a precise positioning information based on an image and a high-definition map, the method comprising:

periodically generating GNSS information including GNSS positioning information and a positioning time;

generating image information including an image of at least one or more facility object, at the positioning time, while a vehicle drives;

obtaining precise positioning information for a capturing position at the positioning time based on the image information, a high-definition map, and the GNSS information;

calculating a positioning difference which is a difference between the GNSS positioning information and the precise positioning information; and generating distribution information including the GNSS information, the positioning difference, and the precise positioning information, wherein the high-definition map includes information for feature point spatial coordinates and a property for each facility object.

8. The method of claim 7, wherein the facility object includes at least one of a pavement marking, a warning sign, a regulatory sign, an mandatory sign, an additional sign, a traffic sign, a traffic control device, a traffic light, a street lamp, a road pole, a manhole, a curb, a median barrier, a fire hydrant, or a building.

9. The method of claim 7, wherein obtaining the precise positioning information includes searching for a unique object present within an error radius of the GNSS receiver from a point corresponding to the GNSS positioning information on the high-definition map, recognizing and extracting a facility object corresponding to the searched-for unique object from the image information, analyzing the image information and calculating a position of a feature point of the extracted facility object, relative to the capturing position, calculating precise positioning information for the capturing position based on the calculated relative position and feature point spatial coordinates of the searched-for unique object, obtaining a difference between the GNSS positioning information and the precise positioning information, calculating the positioning difference, and generating the distribution information.

10. The method of claim 7, wherein the distribution information further includes information for transmission power.

11. The method of claim 7, wherein the GNSS information further includes information for the number of GNSS satellite receptions.

12. The method of claim 9, wherein image areas corresponding to respective feature points of facility objects positioned in a region of interest (ROI) of a road surface in the image information one-to-one correspond to relative coordinates of the objects on the high-definition map from the capturing position, and wherein calculating the relative position obtains a relative position of each point of the road surface to the capturing position considering a slope of the road surface and an angle of the camera.

* * * * *